United States Patent
Power et al.

(10) Patent No.: US 11,722,416 B2
(45) Date of Patent: Aug. 8, 2023

(54) SYSTEM TO MONITOR AND CONTROL DATA IN A NETWORK

(71) Applicant: Intel Corporation, Santa Clara, CA (US)

(72) Inventors: Damien Power, Clonlara (IE); Christopher MacNamara, Limerick (IE); Sinead Murtagh, Shannon (IE); Laura Hunt, Meelick (IE); Gary Loughnane, Athenry (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/534,694

(22) Filed: Nov. 24, 2021

(65) Prior Publication Data

US 2022/0182327 A1 Jun. 9, 2022

Related U.S. Application Data

(63) Continuation of application No. 15/198,127, filed on Jun. 30, 2016, now Pat. No. 11,190,450.

(51) Int. Cl.
*H04L 47/20* (2022.01)
*H04M 15/00* (2006.01)
(Continued)

(52) U.S. Cl.
CPC .......... *H04L 47/20* (2013.01); *H04L 12/1407* (2013.01); *H04L 45/306* (2013.01);
(Continued)

(58) Field of Classification Search
CPC ... H04L 47/20; H04L 12/1407; H04L 45/306; H04L 47/39; H04M 15/66;
(Continued)

(56) References Cited

U.S. PATENT DOCUMENTS 9,179,009 B1   11/2015   Subramanian et al.
10,630,496 B2   4/2020   Lifshitz et al.
(Continued)

FOREIGN PATENT DOCUMENTS

EP        2466787 A1 *  6/2012  ............. H04L 12/14
WO  WO-2011020363 A1 *  2/2011  ......... H04L 12/2863
(Continued)

OTHER PUBLICATIONS

"3GPP TS 29.212 v14.0.0, 3GPP; TSG CT; Policy and Charging Control (PCC); Reference points (Release 14)", [Online] Retrieved from the internet: <(https://portal.3gpp.org/desktopmodules/Specifications/SpecificationDetails.aspx?specificationid=I672)>, (Jun. 23, 2016).

(Continued)

*Primary Examiner* — Yu-Wen Chang
(74) *Attorney, Agent, or Firm* — Schwegman Lundberg & Woessner, P.A.

(57) ABSTRACT

This disclosure is directed to system to monitor and control data flow in a network. At least one device in a core network may be responsible for charging functions related to the data requests. During certain high usage scenarios (e.g., emergencies, special events, etc.), it may be possible for the charging system to be overwhelmed. For example, a policing system may be implemented in the core network to at least manage the flow of requests to the charging system. The policing system may monitor and control request flow to the charging system based on at least one policy. When a request is determined to violate a policy, the policing system may take corrective action to prevent the charging system from being overwhelmed. For example, the policing system may block the request, divert the request to another charging system that may have available capacity, etc.

27 Claims, 6 Drawing Sheets

(51) Int. Cl.
*H04W 28/02* (2009.01)
*H04L 12/14* (2006.01)
*H04L 45/302* (2022.01)
*H04L 47/10* (2022.01)

(52) U.S. Cl.
CPC ............ *H04L 47/39* (2013.01); *H04M 15/66* (2013.01); *H04M 15/8214* (2013.01); *H04M 15/854* (2013.01); *H04W 28/0284* (2013.01); *H04W 28/0289* (2013.01); *H04W 28/0247* (2013.01)

(58) Field of Classification Search
CPC ........... H04M 15/8214; H04M 15/854; H04W 28/0284; H04W 28/0289; H04W 28/0247
See application file for complete search history.

(56) References Cited

U.S. PATENT DOCUMENTS

| | | |
|---|---|---|
| 11,190,450 B2 | 11/2021 | Power et al. |
| 2009/0307746 A1 | 12/2009 | Di et al. |
| 2011/0040845 A1 | 2/2011 | Cai et al. |
| 2012/0084425 A1 | 4/2012 | Riley et al. |
| 2012/0099715 A1 | 4/2012 | Ravishankar et al. |
| 2013/0176908 A1* | 7/2013 | Baniel ................ H04L 41/5022 370/259 |
| 2013/0311672 A1 | 11/2013 | Chastain |
| 2013/0326058 A1 | 12/2013 | Brady et al. |
| 2015/0036547 A1* | 2/2015 | Livne ................... H04M 15/70 370/259 |
| 2015/0049605 A1 | 2/2015 | Mann |
| 2015/0215473 A1 | 7/2015 | Li |
| 2016/0127565 A1* | 5/2016 | Sharma .............. H04L 12/1403 455/406 |
| 2016/0269566 A1 | 9/2016 | Gundamaraju et al. |
| 2016/0277534 A1 | 9/2016 | Mann et al. |
| 2016/0301809 A1 | 10/2016 | Yang et al. |
| 2017/0339282 A1 | 11/2017 | Li et al. |
| 2018/0006953 A1 | 1/2018 | Power et al. |
| 2019/0259097 A1* | 8/2019 | Raleigh ................. H04M 15/00 |

FOREIGN PATENT DOCUMENTS

| | | | |
|---|---|---|---|
| WO | WO-2016066206 A1 * | 5/2016 | ......... H04L 41/0893 |
| WO | WO-2018004944 A1 | 1/2018 | |

OTHER PUBLICATIONS

"3GPP TS 29.214 v14.0.0, 3GPP; TSG CT; Policy and Charging Control (PCC); Reference points (Release 14)", [Online] Retrieved from the internet: <(https://portal.3gpp.org/desktopmodules/Specifications/SpecificationDetails.aspx?specificationid=I674)>, (Jun. 23, 2016).

"U.S. Appl. No. 15/198,127, Appeal Brief filed May 11, 2021", 19 pgs.

"U.S. Appl. No. 15/198,127, Examiner Interview Summary dated Apr. 6, 2020", 3 pgs.

"U.S. Appl. No. 15/198,127, Final Office Action dated Jan. 14, 2021", 29 pgs.

"U.S. Appl. No. 15/198,127, Final Office Action dated Jan. 21, 2020", 16 pgs.

"U.S. Appl. No. 15/198,127, Non Final Office Action dated Aug. 15, 2019", 14 pgs.

"U.S. Appl. No. 15/198,127, Non Final Office Action dated Aug. 28, 2018", 14 pgs.

"U.S. Appl. No. 15/198,127, Non Final Office Action dated Sep. 24, 2020", 24 pgs.

"U.S. Appl. No. 15/198,127, Notice of Allowance dated Aug. 4, 2021", 9 pgs.

"U.S. Appl. No. 15/198,127, Response filed Jun. 22, 2020 to Final Office Action dated Jan. 21, 2020", 15 pgs.

"U.S. Appl. No. 15/198,127, Response filed Nov. 14, 2019 to Non Final Office Action dated Aug. 15, 2019", 13 pgs.

"U.S. Appl. No. 15/198,127, Response filed Dec. 22, 2020 to Non Final Office Action dated Sep. 24, 2020", 12 pgs.

"International Application Serial No. PCT/US2017/035144, International Preliminary Report on Patentability dated Jan. 10, 2019", 10 pgs.

"International Application Serial No. PCT/US2017/035144, International Search Report dated Sep. 6, 2017", 3 pgs.

"International Application Serial No. PCT/US2017/035144, Written Opinion dated Sep. 6, 2017", 8 pgs.

Fajardo, et al., "IETF RFC 6733", ISSN: 2070-1721, (Oct. 2012), 10 pgs.

* cited by examiner

SYSTEM TO MONITOR AND CONTROL DATA IN A NETWORK

PRIORITY

This application is a continuation of U.S. patent application Ser. No. 15/198,127, filed Jun. 30, 2016, which is incorporated by reference herein in its entirety.

TECHNICAL FIELD

The present disclosure relates to network management, and more particularly, to a system to monitor and control signaling traffic flow in a wireless network based on at least one policy.

BACKGROUND

The proliferation of wireless-enabled devices in modern society has enabled an "always connected" existence. For example, users are now commonly equipped with at least one mobile communication device (e.g., a smart phone, a table computer, etc.) capable of providing wireless data access in virtually any location. This ubiquitous availability of information allows users to rely on mobile communication devices for a variety of different uses. Further to personal and/or professional communication that may comprise audible, textual and/or video interaction in terms of phone calls, teleconferencing, social media, etc., mobile communication devices may support a variety of data-driven applications that may support, for example, accessing financial accounts, online shopping, location finding/navigation, gaming/entertainment, encyclopedic services, news services, rating services, etc. As a result, people now employ mobile communications devices in lieu of traditional stationary/wired solutions that may also be available but are not as convenient.

In addition to the above, another class of wireless device is emerging to couple systems that may not have traditionally comprised communication features to a network for purposes of monitoring, reporting, alarming, control, etc. For example, heating/ventilating/air conditioning (HVAC) systems, security systems, appliances, utility meters, parking meters, automobiles, etc. may be coupled to the Internet to provide access to users, operators, service organizations, etc. These "Internet-of-Things" (IoT) devices will provide unprecedented access and control to users.

While expanded wireless implementation may improve user experience, supporting the resulting increased wireless traffic may be problematic. As wireless technology becomes more accessible, wireless interfaces (e.g., base stations) will need to simultaneously handle increased numbers of user equipment (UEs). Moreover, the underlying network will further be taxed with handling increased signaling. For example, charging systems that authorize requests for data (e.g., based on a contract plan associated with a UE) may be required to handle a larger request load. This request flow may spike during periods of high wireless volume such as, for example, emergencies, events, etc. The network needs to be able to handle periods of increased loading.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
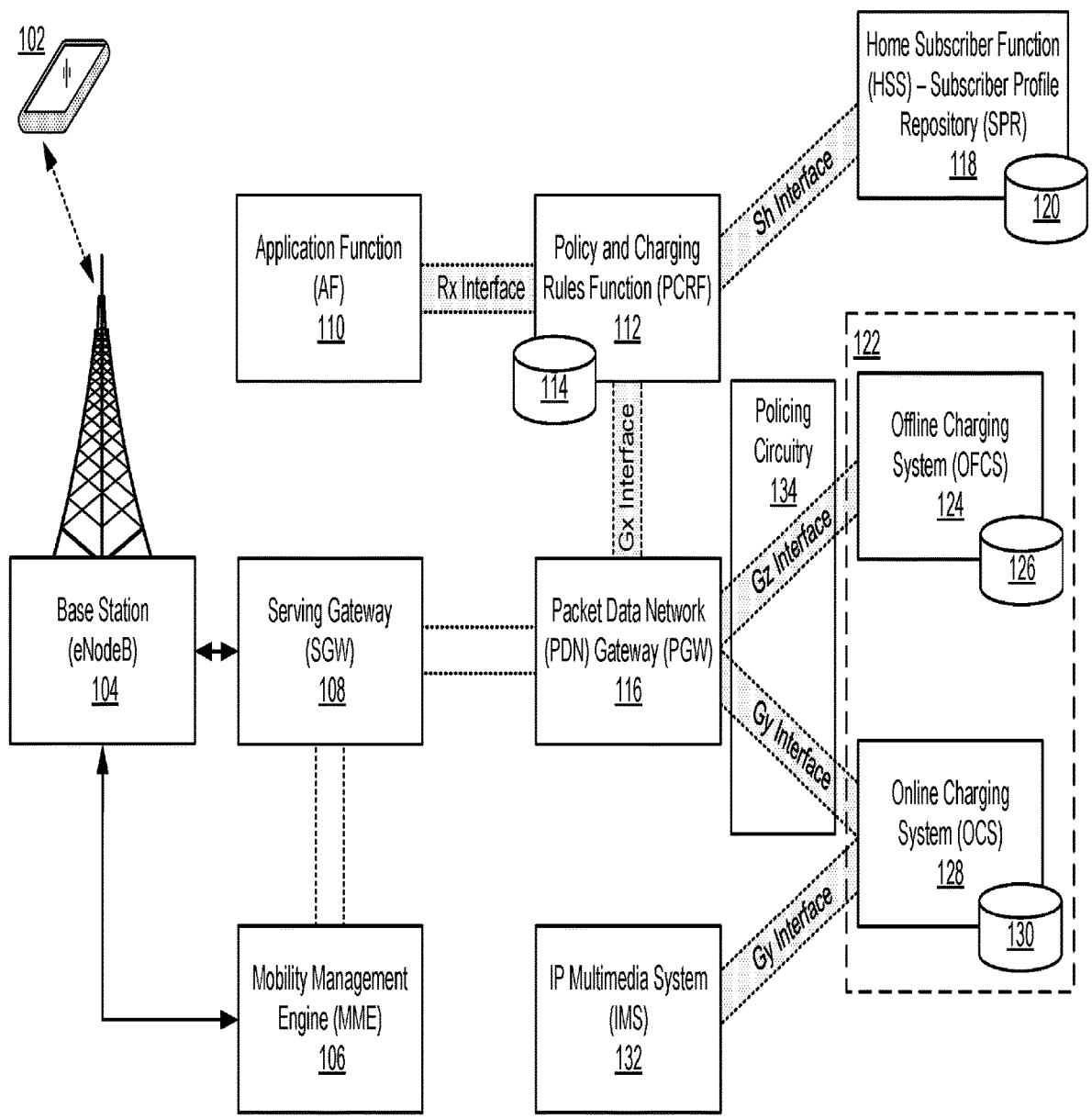
FIG. 1 illustrates an example of a system to monitor and control data flow in a network in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to system to monitor and control data flow in a network. In general, a core network may comprise devices configured to support data requests (e.g., received from wireless devices). At least one device in the core network may be responsible for charging functions related to the data requests. During certain high usage scenarios such as, for example, emergencies, special events, etc., it may be possible for the charging system to be overwhelmed. In at least one embodiment, a policing system may be implemented within the core network to at least manage the flow of requests to the charging system. The policing system may monitor and control request flow to the charging system based on at least one policy. An example policy may be based on an amount of a certain type of request allowed to proceed to the charging system in a certain period of time. A policy may control the request flow for all devices, for a certain subset (e.g., a type, classification, affiliation, etc.) of devices, for a certain device, etc. When a request is determined to violate a policy, the policing system may take corrective action to prevent the charging system from being overwhelmed. For example, the policing system may block the request, diverting the request to another charging system that may have available capacity, etc.

In at least one embodiment, at least one device for network traffic control may comprise, for example, communication circuitry and policing circuitry. The communication circuitry may be to interact with other devices in a core network. The policing circuitry may be to analyze a request intended for a credit control system in the core network, determine whether the request violates a policy controlling data flow to the credit control system and control whether the request is allowed to proceed to the credit control system based on the policy determination.

In at least one embodiment, the core network may be a Long Term Evolution (LTE) evolved packet core (EPC) network. The request may be received from, for example, at least one wireless device via a base station coupled to the EPC network. The policing circuitry may comprise at least processing circuitry to execute instructions to cause the processing circuitry to at least perform policing operations.

In at least one embodiment, the devices in the core network may be linked via interfaces with which the policing circuitry is to interact to control which requests are allowed to proceed to the credit control system. The interfaces may be based on the Diameter protocol. For example, a Diameter protocol stack may comprise a new policing agent at the application level to at least identify request traffic routed to the credit control system and identify at least one type of request making up the request traffic.

In at least one embodiment, the policing circuitry may further be to take corrective action when it is determined that the request violates the policy. An example corrective action may comprise the policing circuitry at least blocking the request from proceeding to the credit control system. Another example corrective action may comprise the policing circuitry at least redirecting the request to another credit control system having available capacity. The policing circuitry may further be to receive configuration data for configuring at least the policy. Consistent with the present disclosure, an example method for network traffic control may comprise analyzing, using policing circuitry in a core network, a request intended for a credit control system in the core network, determining, using the policing circuitry, whether the request violates a policy controlling data flow to the credit control system and allowing, using the policing circuitry, the request to proceed to the credit control system or block the request from proceeding to the credit control system based on the policy determination.

FIG. 1 illustrates an example of a system to monitor and control data flow in a network in accordance with at least one embodiment of the present disclosure. The present disclosure may reference components, systems, methodologies, etc. associated with certain technologies such as, for example, the 3GPP Long Term Evolution (LTE) or LTE-Advanced (LTE-A)-based wireless network standards, such as LTE Advanced Pro (LTE-A Pro), and related specifications that may be associated with the Diameter Protocol, including current, previous and future versions. These standards/specifications may include, for example, 3GPP TS 36.300, V11.2.0, "Evolved Universal Terrestrial Radio Access (E-UTRA) and Evolved Universal Terrestrial Radio Access Network (E-UTRAN); Overall description; Stage 2 (Release 11)". Specific technologies are referenced to provide a readily comprehensible perspective from which to understand the embodiments disclosed herein, but are not intended to limit possible implementations to employing only these technologies. Moreover, the inclusion of an apostrophe after an item number (e.g., 100') in a figure indicates that an example embodiment of the item is being illustrated. These examples are provided merely for the sake of explanation.

As referenced herein, "charging" may pertain to activities related to the characteristics of a subscriber's relationship with a wireless access provider when the subscriber utilizes network resources. For example, a subscriber may utilize their mobile wireless device (e.g., smart phone) to download data via a wireless cellular network (e.g., LTE network). The subscriber's ability to download data, the quality of the download (e.g., speed), if the account of the subscriber will be debited/billed for the download, etc. are charging-related functions. These determinations may be made by a charging system operating within a core network of the wireless cellular system.

In general, system 100 may be network configured to support a wireless front end of a cellular network. In terms of LTE, system 100 may be an EPC network. While an EPC network implementation is utilized in this disclosure to describe the various embodiments, other types of networks may be employed. For example, in addition to existing fourth generation (4G) wireless networks such as LTE networks, the systems, methodologies, etc. disclosed herein may likewise be implemented in a system including entities performing a wireless core network function role in emerging fifth generation (5G) networks. System 100 may comprise, for example, a network of devices that may be configured to perform different functions such as shown at 106 to 134 in FIG. 1. For example, computing devices such as servers (e.g., in a blade/rack configuration) may be coupled by a wired network (e.g., Ethernet) to work individually or collaboratively to perform the disclosed functionality. While individual functions are illustrated at 106 to 134, it is possible for one server to perform more than one function, for multiple servers to work together to perform a single function, etc. Moreover, functions 106 to 134 may be coupled by various interfaces. Interfaces may include hardware and/or software to allow one function to provide data to another. Consistent with the present disclosure, the Rx, Sh, Gx, Gy and Gz interfaces may be based on the Diameter protocol. Diameter may provide interfaces for authentication, authorization and accounting in system 100.

BS 104 corresponds to a "cell" in a wireless cellular communication system (e.g., LTE). Wireless cellular systems may typically comprise a plurality of cells arranged in close proximity that cover large geographic areas to provide uninterrupted wireless service to service subscribers. However, only one UE 102 and one BS 104 are illustrated in FIG. 1 for the sake of clarity. In an example of operation, UE 102 may communicate wirelessly with BS 104 when operating within the cell (e.g., when within the transmission range of BS 104). UE 102 may comprise at least one a wireless-enabled apparatus such as, for example, a mobile communication device such as a cellular handset or a smartphone based on the Android® OS from the Google Corporation, iOS® or Mac OS® from the Apple Corporation, Windows® OS from the Microsoft Corporation, Tizen OS™ from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a device or system that does not operate primarily as a data processor but is equipped with at least basic data processing and communication resources such as an Internet-of-Things (IoT) device, a typically stationary computing device such as a desktop computer, server, a group of computing devices in a high performance computing (HPC) architecture, a smart television or other "smart" device, small form factor computing solutions (e.g., for space-limited applications, TV set-top boxes, etc.) like the Next Unit of Computing (NUC) platform from the Intel Corporation, etc.

BS 104 interacts with mobility management engine (MME) 106 and/or serving gateway (SGW) 108 to support the wireless activity of UE 102. MME 106 may generally control BS 104, and in that capacity may manage bearer establishment, idle mode and handover operations for UE 102. This may include choosing at least one SGW 108 when UE 102 initiates operation in the cell of BS 104. SGW 108 may route data packets from UE 102 to other locations and may store the context (e.g., parameters, device state, etc.) of UE 102 during handover to another cell, may replicate user traffic in instances of lawful interception, etc. Application function (AF) 110 may offer and/or control applications executing within system 100 that may require policy and charging control. An example of such an application is the Proxy-Call Session Control Function (P-CSCF). AF 110 may provide quality of service (QoS) control and charging functionality for these applications. AF 110 may be coupled to Policy and Charging Rules Function (PRCF) 112 via the Rx interface (e.g., a Diameter QoS/Policy Interface such as defined in the ETSI TS 129 214 V7.4.0 specification). PCRF 112 may comprise at least a database 114 including provisions for policy control decision and flow-based charging control functionalities in system 100. PCRF 112 may control service data flow detection, gating, QoS, flow-based charging, etc.

As illustrated in system 100, PCRF 112 may be coupled to Packet Data Network (PDN) Gateway (collectively, "PGW") 116 via the Gx Interface (e.g., a Diameter QoS/Policy Interface such as defined in the ETSI TS 129 212 V7.4.0 specification). PGW 116 may provide a gateway allowing UE 102 to access external packet data networks (e.g., Internet). PCRF 112 may also be coupled to Home Subscriber Function (HSS)—Subscriber Profile Repository (SPR) 118 via the Sh Interface (e.g., a Subscriber Profile interface such as defined in the 3GPP TS 29.329 V9.2.0 specification). HSS-SPR 118 may include at least a database 120 to store user and subscription-related data. For example, the HSS may authenticate subscribers (e.g., utilizing an International Mobile Subscriber Identity (IMSI) alone or combined with other public or private user data as a key), while the SPR may maintain subscriber policies & profiles for QoS management.

Charging system 122 in system 100 may comprise Offline Charging System (OFCS) 124 including at least database 126 and Online Charging System (OCS) 128 including database 130. PDN 116 may be coupled to OFSC 124 via the Gz interface (e.g., an offline charging interface such as defined in the 3GPP TS 29.209 V680 specification) and to OCS 128 via the Gy interface (e.g., an online charging interface such as defined in the 3GPP TS 32.299 VD40 specification). OFCS 124 may collect resource usage information in database 126 concurrently with the usage of a resource (e.g., streaming media to UE 102), and may then generate files for billing the user for the access at a later time. OFCS 124 may not affect real time access to the resource. OCS 128 may allow a service provider to charge the user in real time based on resource usage. OCS 128 may, for example, provide credit management and grant credit-based on time, traffic volume or chargeable events. In addition, Internet Protocol (IP) Multimedia System (e.g., collectively, "IMS") 132 may also be coupled to OCS 128 through the Gy interface. IMS 132 may utilize IP protocol-based communication to send multimedia data (e.g., text, audio, video, etc.) to UE 102.

Whenever UE 102 attempts to download data (e.g., in response to running an application, streaming media, etc.), charging system 122 may receive a request to determine whether the user of UE 102 is a subscriber, the limitations of the subscription, whether there is available credit or the user should be billed for the access, etc. Charging system 122 may be stressed when a large number of new access requests are generated due to, for example, many users are attempting to download data to UEs 102 at the same time (e.g., during an emergency, a special event such as a holiday, election, sporting event, concert, etc.), poorly designed services, policy-triggered re-rating on all open sessions, etc. This may cause a "storm" of reconnection requests to charging system 122. To avoid a failure, existing systems may enter into "continue mode" wherein users are allowed free access, which may result in a substantial loss of revenue for the access provider.

In at least one embodiment, policing circuitry 134 may interact with at least the Gz and Gy interfaces to at least control the flow of requests to charging system 122. Policing circuitry 134 may be configured with at least one policy to control the flow of requests to charging system 122. For example, the policy may indicate a certain type of request and a rate for the certain type of request. Examples of a type indication may include, but are not limited to, only new requests, only requests received from a certain UE 102 (e.g., mobile communication devices, IoT devices, etc.) or a certain BS 104 (e.g., to perform regional control), a number of peer diameter-based protocol nodes originating charging requests to charging system 122, etc. The rate limit may be specified in, for example, transactions per second (TPS), etc. For example, when policing circuitry 134 determines that the TPS for new requests to charging system 122 has risen above a certain limit, policing circuitry 134 may proceed to take corrective action. Corrective action may include, for example, blocking one or more requests to charging system 122, diverting requests to another charging system 122 (e.g., executing on another server) that has available capacity to handle the requests, etc. In this manner, policing circuitry 134 may limit the impact of a spike in requests to charging system 122 due to significant and/or unforeseen events, overloads caused by poorly configured peer nodes on the network, etc. without overburdening functions in system 100 to perform request flow control, which may result in better service assurance on the network.

In at least one embodiment, policing circuitry 134 may be configurable to perform other functions. For example, policing circuitry 134 may be capable of providing feedback to one or more entities that may be interested in the monitoring/policing functions (e.g., network owners, governmental regulators and/or emergency management agencies, consumer advocacy groups, etc.). Feedback may comprise, for example, alert indicators/signals/messages, status reporting including various statistics, metrics, etc. pertaining to message flow rates, types and amounts of policy violations, types and amounts of corrective actions, durations for network overloads, etc.

Consistent with the present disclosure, some or all of system 100 may be composed of a cloud computing architecture coupled to a fog mesh network. The could computing architecture may include at least one computing device (e.g., server) coupled to a network (e.g., the Internet). For example, the at least one cloud server may be capable of providing data processing and/or data storage services to a variety of remotely-situated data consumers. The cloud computing system may be in communication with a mesh network of devices (e.g., a "fog") operating at the edge of the cloud. In at least one embodiment, the fog devices may include at least IoT devices.

The fog may be considered to be a massively interconnected network wherein the devices are in communication with each other (e.g., via radio links). This interaction may be performed using, for example, the open interconnect consortium (OIC) standard specification 1.0 released by the Open Connectivity Foundation™ (OCF) on Dec. 23, 2015. The OIC standard may allow for device-to-device discovery and the establishment of communications for interconnects. Other interconnection protocols that may be usable include, for example, the optimized link state routing (OLSR) Protocol, the better approach to mobile ad-hoc networking (B.A.T.M.A.N.), etc.

Communications within the fog may be passed along the most convenient path between any device to reach gateways providing access to the cloud. In these networks, the number of interconnections provide substantial redundancy, allowing communications to be maintained, even with the loss some of devices. Further, the mesh network architecture may allow limited devices (e.g., very low power, located at a distance from infrastructure) to be used, as the range to connect to another device in the fog may be less than the range to connect to the gateways.

In at least one embodiment, the cloud/fog devices may be configured using an imperative programming style wherein each device may be assigned a specific function and communication partner. In another configuration, some or all of the cloud/fog devices may be configured using a declarative programming style that may allow any of the devices to reconfigure their operations, communications, etc. on demand, such as to provide needed resources in response to conditions, queries, and device failures. As an example, when policing circuitry 134 takes corrective action to limit the number of requests being directed to charging system 122, one or more devices that are programmed using the declarative programming style may reconfigure their operation (e.g., in response to a request from policing circuitry 134 or automatically based on the sensed high TPS condition of system 100) to support the charging function in charging system 122. Policing circuitry 134 may continue to block or redirect requests being submitted to charging system 122 until the reconfiguration of the devices into a mode supporting the charging system is complete. Moreover, cloud/fog devices may reconfigure themselves to serve other functions in system 100 such as, for example, the policing function should system 100 expand or the TPS rise to a level where existing policing circuitry 134 is not able to perform flow control for charging system 122.

At least one example cloud/fog architecture may arrange the various systems making up policing circuitry 134 (e.g., hardware, software/agents, interfaces, etc.) in a centralized location or in a location geographically proximate to at least one IoT device, a group of IoT devices, etc. being serviced by at least one interface to charging system 122. Locating policing circuitry 134 in close proximity to charging system 122 may facilitate policing circuitry 134 also monitoring at least one entry point to system 100 (e.g., an "edge" where a mesh network or groups of IoT devices may exist) to provide overload protection for the entire network.

Further to the above, an operational scenario may exist wherein a centralized element of policing circuitry 134 (e.g., a software agent) may inform an orchestration layer, a management and organization (MANO) layer, etc. that an overload condition is occurring. The orchestration layer may then scale additional charging systems by, for example, allocating (or reallocating) hardware-based resources to assist with charging operations, implementing a software solution such as one or more virtual machine (VM)-based charging systems, etc. to increase capacity based on the report sent by policing circuitry 134 indicating the detected increased signaling load level. For example, the orchestration layer may estimate the additional capacity required, which may be characterized as overload protection and service deployment to match network load. In performing service deployment, the orchestration layer may utilize available resources, or may temporarily reallocate shared resources, to assemble a "composed" edge appliance to perform the required supporting functionality. A composed edge appliance may include individual resources (e.g., complete devices, portions of devices, etc.) that are organized to operate collaboratively to perform one or more functions. As a result, the composed edge appliance may provide charging functionality by relying on resources donated by one or more individual devices. It may also be possible for resources to be shared between composed edge appliances so that, for example, one resource (e.g., a device having access to provide a contracted data allowance for users) provides the same functionality for two different composed edge appliances. There may be different ways to control how edge appliances are composed. For example, if an OCF resource is "stateful," a typical scenario may be that when a charging sessions starts the session usually remain with the same OCF resource instance. Thus, if policing is triggered at the start of a charging session, any policed/overload requests may be routed to resources allocated when the session started. On the other hand, if an OCF resource is "stateless" when a charging sessions start, any OCF resource instance may be reallocated during the session. Thus, if policing is triggered at any time during the charging session, any policed/overload requests may then be routed to any available resource.

Figure 2:
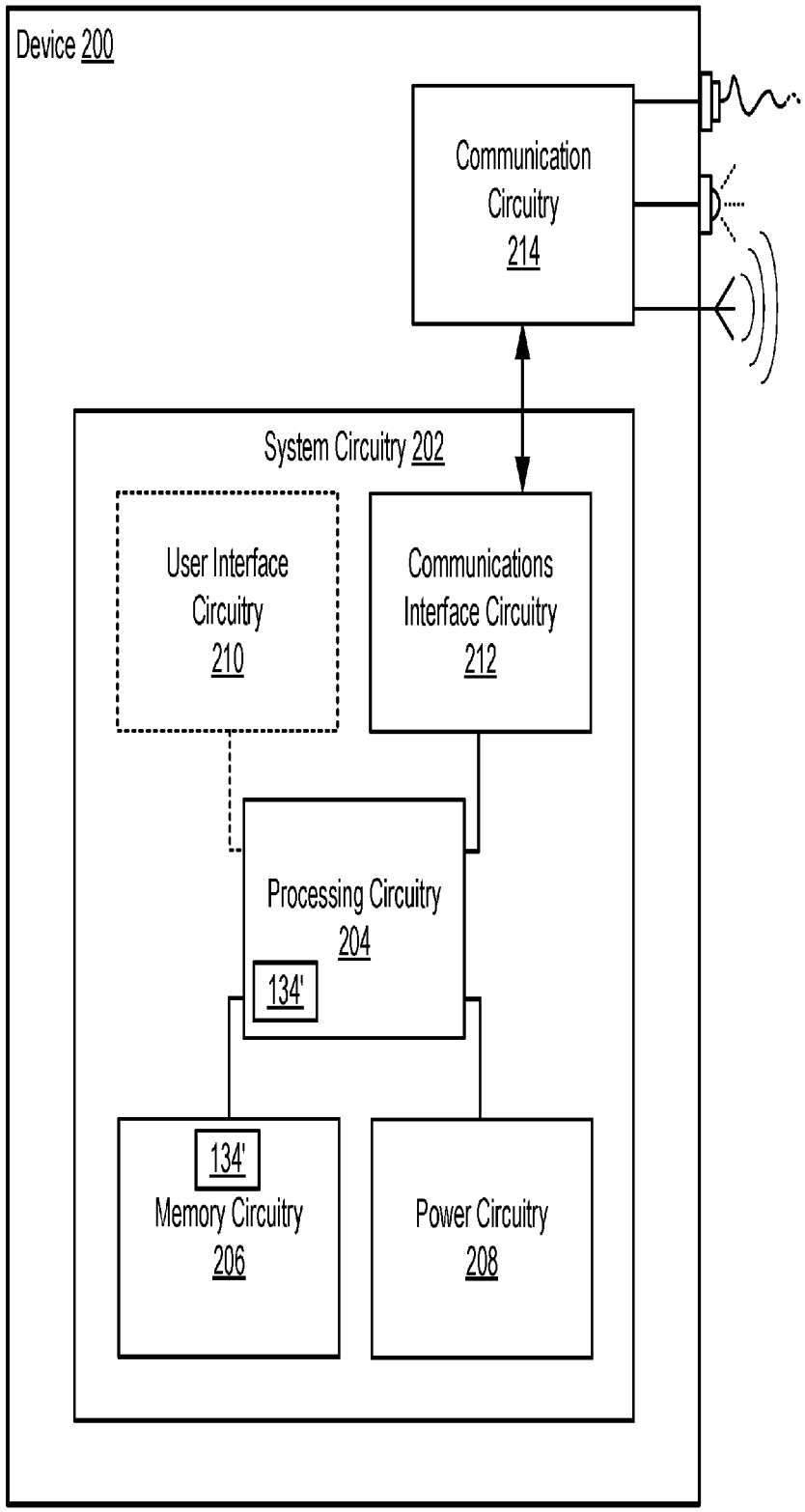
FIG. 2 illustrates an example configuration for a device usable in accordance with at least one embodiment of the present disclosure.

FIG. 2 illustrates an example configuration for a device usable in accordance with at least one embodiment of the present disclosure. Device 200 may be capable of performing any of the functions described above with respect to FIG. 1. However, device 200 is presented only as an example of an apparatus usable in embodiments consistent with the present disclosure, and is not intended to limit any of the various embodiments to any particular manner of implementation. Moreover, a plurality of devices 200 may work alone or collaboratively to make up system 100.

Device 200 may comprise system circuitry 202 to manage device operations. System circuitry 202 may include, for example, processing circuitry 204, memory circuitry 206, power circuitry 208, user interface circuitry 210 and communication interface circuitry 212. Device 200 may further include communication circuitry 214. While communication circuitry 214 is illustrated as separate from system circuitry 200, the example configuration shown in FIG. 2 has been provided merely for the sake of explanation. Some or all of the functionality associated with communication circuitry 214 may also be incorporated into system circuitry 200.

In device 200, processing circuitry 204 may comprise one or more processors situated in separate components, or alternatively one or more processing cores in a single component (e.g., in a system-on-a-chip (SoC)), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) to provide an interface through which processing circuitry 204 may interact with other system components that may be operating at different speeds, on different buses, etc. Moreover, some or all of the functionality commonly associated with the support circuitry may also be incorporated in the same physical package as the processor (e.g., such as in the Sandy Bridge, Broadwell and Skylake families of processors available from the Intel Corporation).

Processing circuitry 204 may be configured to execute various instructions in device 200. Instructions may include program code configured to cause processing circuitry 204 to perform activities related to reading data, writing data, processing data, formulating data, converting data, transforming data, etc. Information (e.g., instructions, data, etc.) may be stored in memory circuitry 206. Memory circuitry 206 may comprise random access memory (RAM) and/or read-only memory (ROM) in a fixed or removable format. RAM may include volatile memory configured to hold information during the operation of device 200 such as, for example, static RAM (SRAM) or Dynamic RAM (DRAM). ROM may include non-volatile (NV) memory circuitry configured based on BIOS, UEFI, etc. to provide instructions when device 200 is activated, programmable memories such as electronic programmable ROMs (EPROMS), Flash, etc. Other fixed/removable memory may include, but are not limited to, example magnetic memories such as hard disk (HD) drives, etc., example electronic memories such as solid state flash memory (e.g., embedded multimedia card (eMMC), etc.), removable memory cards or sticks (e.g., micro storage device (uSD), USB, etc.), example optical memories such as compact disc-based ROM (CD-ROM), Digital Video Disks (DVD), Blu-Ray Disks, etc.

Power circuitry 208 may include internal power sources (e.g., a battery, fuel cell, etc.) and/or external power sources (e.g., electromechanical or solar generator, power grid, external fuel cell, etc.), and related circuitry configured to supply device 200 with the power needed to operate. User interface circuitry 210 may include hardware and/or software to allow users to interact with device 200 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 210 may be incorporated within device 200 and/or may be coupled to device 200 via a wired or wireless communication medium. User interface circuitry 210 may be optional in certain circumstances such as, for example, a situation wherein device 200 is a server (e.g., rack server, blade server, etc.) that does not include user interface circuitry 210, and instead relies on another device (e.g., a management terminal) for user interface functionality.

Communication interface circuitry 212 may be configured to manage packet routing and other control functions for communication circuitry 214, which may be configured to support wired and/or wireless communications. In some instances, device 200 may comprise more than one set of communication circuitry 214 (e.g., including separate physical interface circuitry for wired protocols and/or wireless radios) managed by communication interface circuitry 212. Wired communications may include serial and parallel wired mediums such as, for example, Ethernet, USB, FireWire®, Thunderbolt™, Digital Video Interface (DVI), High-Definition Multimedia Interface (HDMI), DisplayPort™, etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth®, WLAN, Wi-Fi, etc.), long range wireless mediums (e.g., cellular wide-area radio communication technology, satellite-based communications, etc.), electronic communications via sound waves, long-range optical communications, etc. In one embodiment, communication interface circuitry 212 may be configured to prevent wireless communications that are active in communication circuitry 214 from interfering with each other. In performing this function, communication interface circuitry 212 may schedule activities for communication circuitry 214 based on, for example, the relative priority of messages awaiting transmission. While the embodiment disclosed in FIG. 2 illustrates communication interface circuitry 212 being separate from communication circuitry 214, it may also be possible for the functionality of communication interface circuitry 212 and communication circuitry 214 to be incorporated into the same circuitry.

The various examples of circuitry described in conjunction with different embodiments of the present disclosure may comprise hardware, or combinations of hardware and software in which, for example, the software may be implemented by the hardware to then configure certain functionality in the hardware, configure the hardware to perform one or more specific operations, configure other hardware, etc. For example, portions of policing circuitry 134' may reside both in processing circuitry 204 and memory circuitry 206. Program code for policing circuitry 134' may be stored in NV memory within memory circuitry 206. The program code may then be used to load policing circuitry 134' into volatile memory (e.g., RAM) during operation of device 200. For example, processing circuitry 204 may execute the program code to transform processing circuitry 204 from a general purpose data processing circuitry (e.g., a microprocessor) into specialized circuitry to perform the operations of policing circuitry 134'. Policing circuitry 134' may, for example, interact with at least communication circuitry 214 to monitor requests made to charging system 122, to implement corrective action resulting from policy violations, etc. It may also be possible for policing circuitry 134' to interact with user interface circuitry 210 to inform an operator of system 100 that a policy violation has occurred. This may allow the operator to, for example, investigate the cause of the policy violation, perform other corrective actions, etc.

Figure 3:
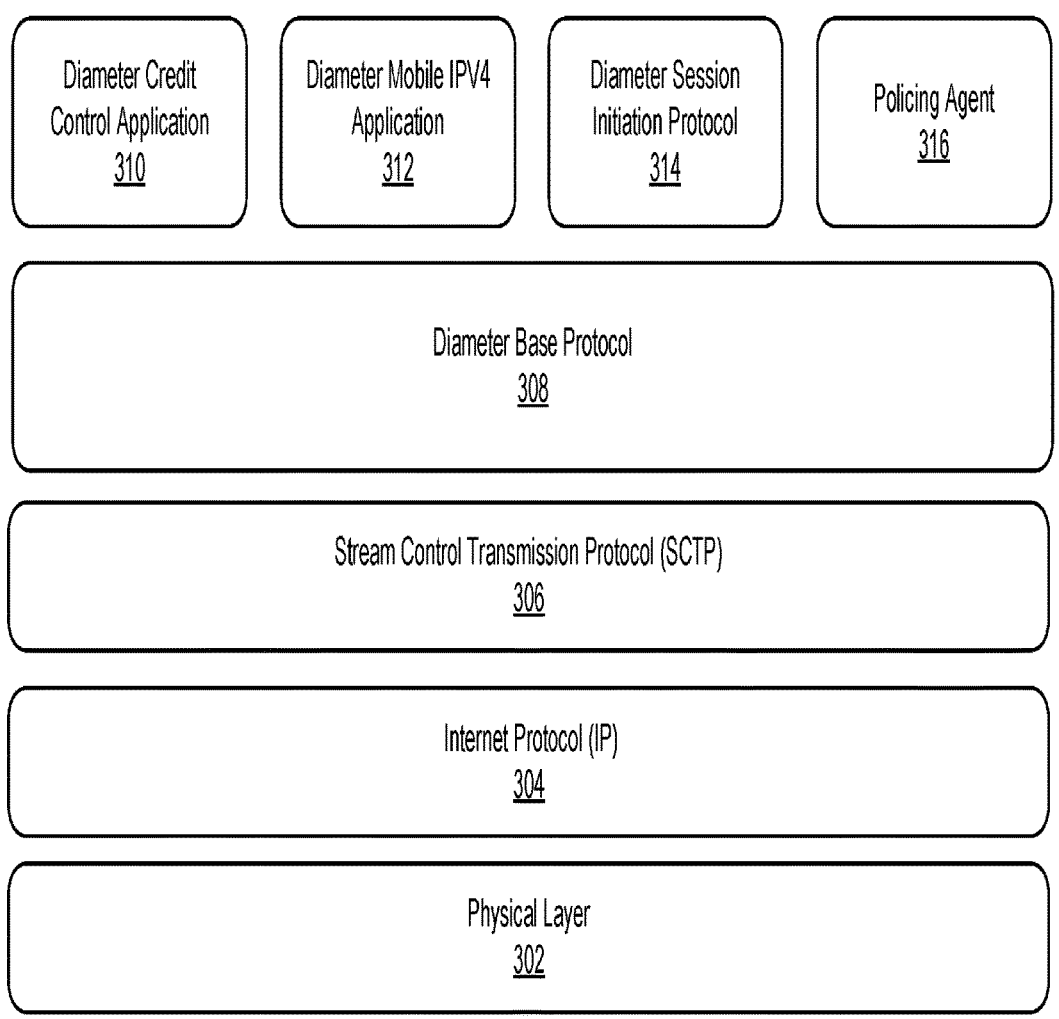
FIG. 3 illustrates an example configuration for a protocol stack usable in accordance with at least one embodiment of the present disclosure.

FIG. 3 illustrates an example configuration for a protocol stack usable in accordance with at least one embodiment of the present disclosure. Example diameter protocol stack 300 in FIG. 3 illustrates how the Diameter protocol may be modified consistent with the present disclosure. Physical layer 302 may comprise the physical network (e.g., Ethernet) via which devices such as device 200 may interact in system 100. IP protocol layer 304 may format the packets that will be transmitted via Physical layer 302 as IP packets. Stream Control Transmission Protocol (SCTP) layer 306 is a transport-layer protocol that may provide features such as connection-oriented data stream support, reliability, flow control and multiplexing. Diameter base protocol layer 308 may provide, for example, capabilities-exchange-request/ capabilities-exchange-answer (CER/CEA) message capabilities for use in supporting diameter applications such as shown in example 300.

Example diameter applications are illustrated in the top level of example 300. Diameter credit control application 310 may provide a general solution to real-time cost and credit-control. Diameter credit control application 310 may be used to implement real-time credit-control for a variety of end user services such as network access, Session Initiation Protocol (SIP) services, messaging services, and download services. Diameter mobile IPV4 application 312 may allow a Diameter server to authenticate, authorize and collect accounting information for Mobile IPv4 services rendered to a mobile node. Diameter session initiation protocol (SIP) 314 may allow a Diameter client to request the authentication of users and authorization of SIP resources usage from a Diameter server. In at least one embodiment, Diameter applications 310 to 314 may be accompanied by a policing agent application 316 (e.g., corresponding to policing circuitry 134) that may monitor requests submitted to charging system 122 via Diameter interfaces. Policing Agent 316 may determine whether a policy has been violated, and if a violation is determined, may implement corrective action to prevent charging system 122 from becoming overwhelmed.

While an example implementation is disclosed wherein policing circuitry 134 is separate from software-based policing agent 316, this is merely for the sake of explanation. It may also be possible for policing circuitry 134 to perform some or all of the functions of policing agent 316 utilizing, for example, firmware, logic, programmable circuitry, etc. configured to monitor message flow. As a result, an essentially hardware-based solution may exist wherein policing circuitry 134 situated in the network to control the flow of messages to charging system 122.

Figure 4:
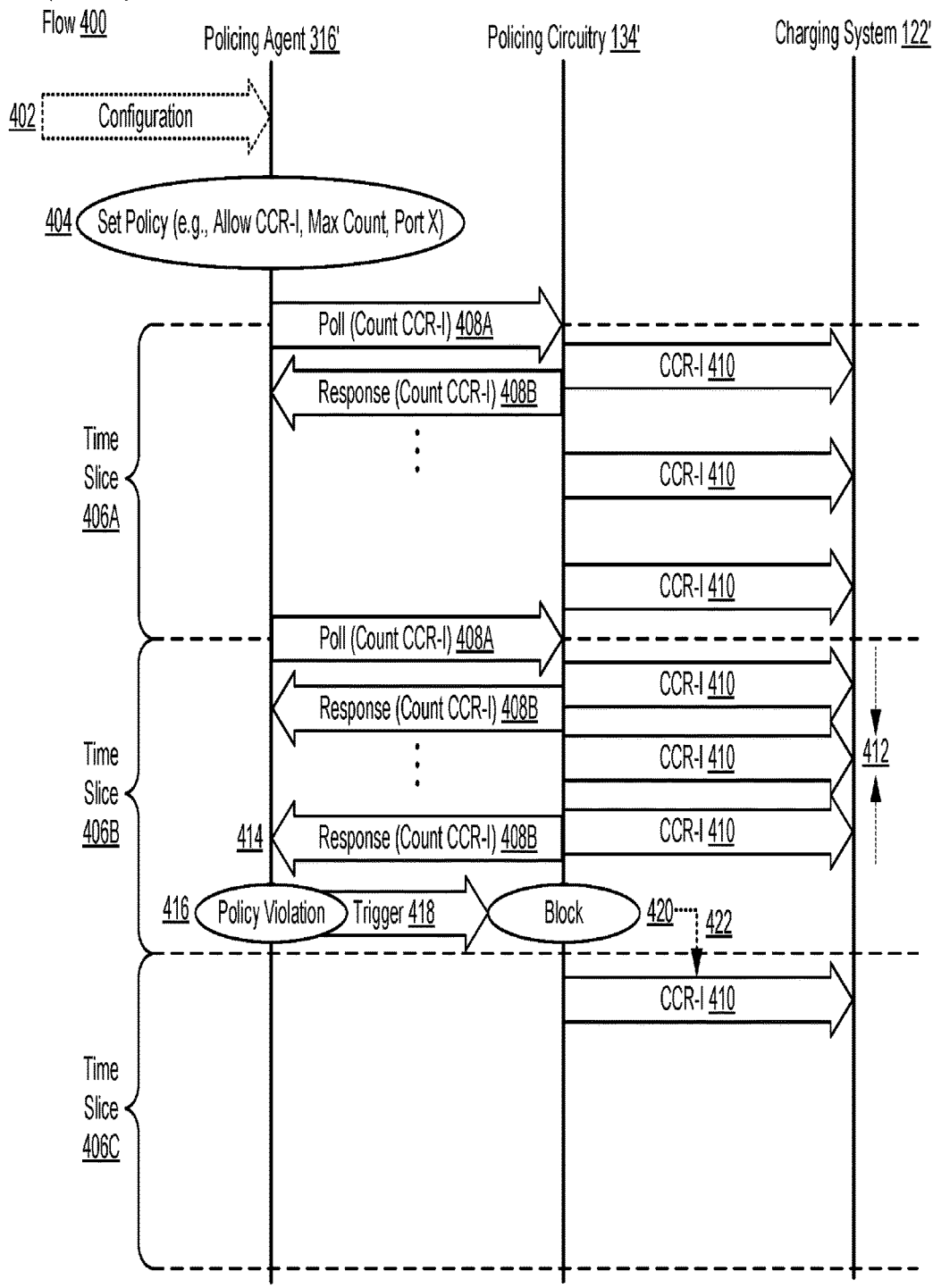
FIG. 4 illustrates an example of controlling requests to a charging system in accordance with at least one embodiment of the present disclosure.

FIG. 4 illustrates an example of controlling requests to a charging system in accordance with at least one embodiment of the present disclosure. Example message flow 400 illustrates how policing circuitry may operate to protect against a flood of requests to charging system 122'. In at least one embodiment, policing agent 316' may manage the operation of policing circuitry 134' to control the message flow to charging system 122'. Policing agent 316' may optionally be configured as shown at 402. The configuration may set a policy such as shown at 404. For example, the policy may allow initial credit control requests (CCR-I) through to port X based on a maximum level of transactions per time slice (Max Count). During each time slice 406 (e.g., 406A, 406B, 406C, etc.), policing circuitry 124' may control the flow of messages (e.g., CCR-I messages 410) to charging systems 122'. Also during each time slice 406, policing agent 316' may poll policing circuitry 134 as shown at 408A and receive responses from policing circuitry 134' as shown at 408B. For example, polls 408A may be sent inquiring about the number of CCR-I messages counted by policing circuitry 134' (e.g., "Count CCR-I") so far in a time slice 406. Policing circuitry 134' may respond as shown at 408B with a number of CCR-I messages counted so far in the time slice 406. Consistent with the present disclosure, polls 208A may be sent periodically (e.g., on a fixed interval), on an as-needed basis, in response to an event, etc.

In example time slice 406A, CCR-I messages 410 are being received at policing circuitry 134' at a steady rate. Policing agent 316' may periodically transmit requests 408A to policing circuitry 134' and receive responses 408B from policing circuitry 134' including at least a count of CCR-I messages 410. A violation of the policy set at 404 is not observed in time slice 406A. However, in time slice 406B a substantial increase is occurring in at least the number of CCR-I messages 410 received at policing circuitry 134' (e.g., caused by increased data downloads due to an emergency, a special event, an application or network issue such as an increase in initial request traffic originating from misbehaving peer nodes, a rogue peer node attempting a denial-of-service attack on charging system 122', etc.). This increase in message traffic is evident in time slice 406B in that CCR-I messages 410 are being received much closer together in time as shown at 412. The response 408B received by policing agent 316' at 414 may include a count of CCR-I messages 410 that exceeds the policy that was set at 404. This means that the TPS for the particular type of request being monitored under the policy has been exceeded. At 416 a policy violation may be realized in policing agent 316', which may cause policing agent 316' to trigger corrective action in policing circuitry 134' as shown at 418 to, for example, prevent charging system 122' from becoming overwhelmed with new requests (e.g., CCR-I messages 410). At 420, policing circuitry 134' may block subsequent CCR-I messages 410 received during time slice 406B, which may force the requestor to resubmit the request in time slice 406C as shown at 422. Alternatively, policing circuitry 134' may redirect CCR-I messages 410 to other charging systems 122' with available capacity to handle the requests.

Figure 5:
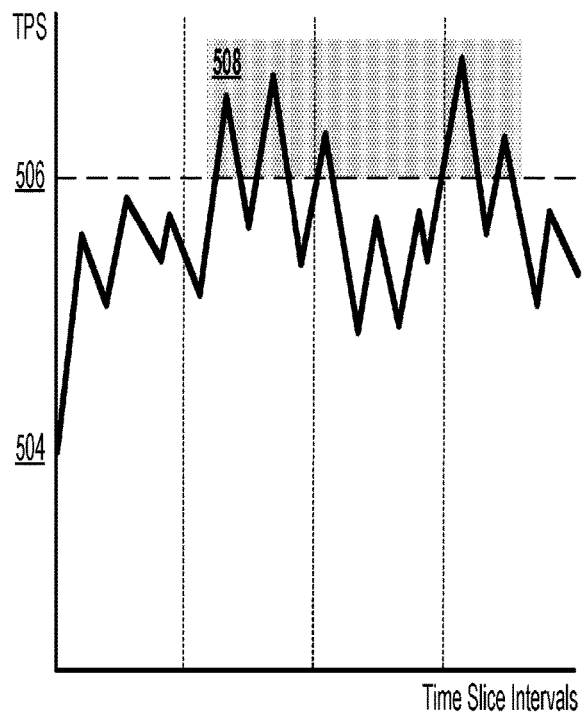
FIG. 5 illustrates example charts of system performance before and after implementation of a system to monitor and control data flow in a wireless network in accordance with at least one embodiment of the present disclosure.
Figure 5:
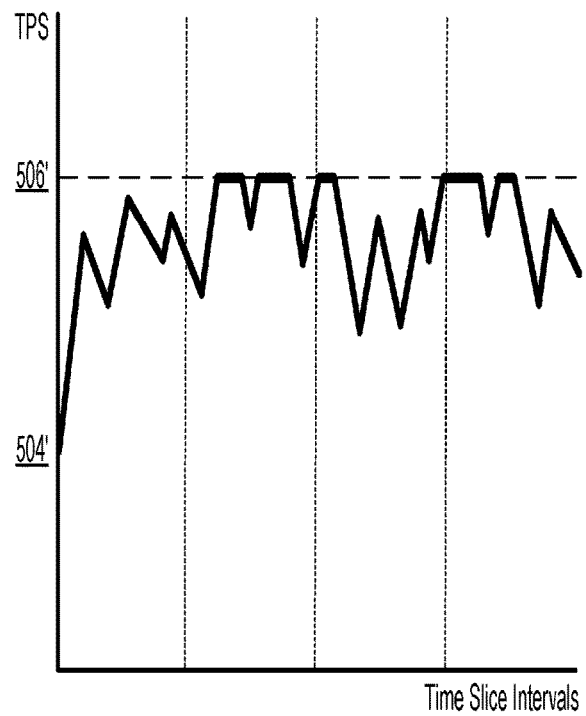

FIG. 5 illustrates example charts of system performance before and after implementation of a system to monitor and control data flow in a wireless network in accordance with at least one embodiment of the present disclosure. FIG. 5 illustrates two example charts 500 and 502. Example TPS without policing 500 plots TPS vs. time slice intervals in a system without any policing functionality. Plot 504 illustrates the TPS rising above safe limit level 506 to an unsafe region 508 where charging system 122 may become overwhelmed by requests, possibly causing the service provider to enter a continue mode to prevent the system from failing. In the continue mode users may be allowed free access, and thus the service provider may lose revenue.

Example TPS with policing 502 shows a similar scenario to example 500 but managed by policing functionality (e.g., policing circuitry 134). Plot 504' illustrates the TPS rising to the safe limit level 506' where it is then limited by policing circuitry 134 performing corrective actions. Thus, the TPS is not allowed to approach a level where charging system 122 may become overwhelmed. When the corrective action implemented by policing circuitry 134 is to block incoming requests that violate a policy, the blocking action may cause a lag to occur on UE 102 (e.g., due to UE 102 having to resubmit the request in the next time slice). However, the lag may be short enough to not substantially affect the QoS provided to the user of UE 102.

Figure 6:
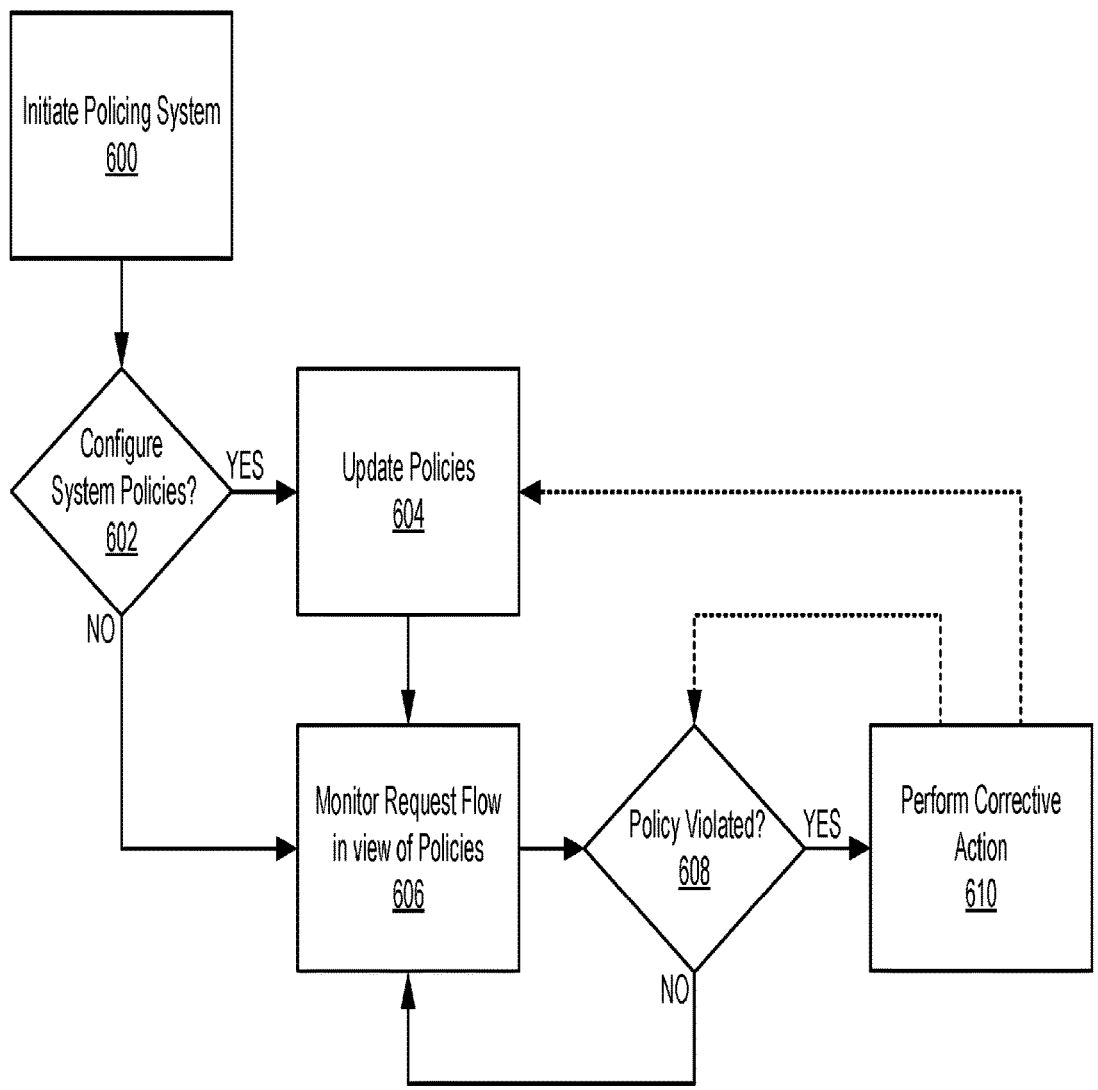
FIG. 6 illustrates example operations for monitoring and controlling data flow in a network in accordance with at least one embodiment of the present disclosure.

FIG. 6 illustrates example operations for monitoring and controlling data flow in a network in accordance with at least one embodiment of the present disclosure. In operation 600 a policing system may be initiated. A determination may then be made in operation 602 as to whether to configure system policies (e.g., at least one policy). For example, the determination may be based on whether existing policies have expired (e.g., due to an expiration condition set in the policies), an update being received by the policy system, a change to the configuration of the overall system (e.g., a core network of a cellular wireless system), etc. If in operation 602 it is determined that configuration is required, then in operation 604 the policies may be updated.

Following either a determination in operation 602 that no policy update is required or operation 604, in operation 606 the policing system may monitor a flow of requests (e.g., to a charging system) in view of the policies. A determination may then be made in operation 608 as to whether a policy has been violated. A determination in operation 608 that no policies have been violated may be followed by continued monitoring in operation 606. If in operation 608 it is determined that a policy has been violated, then in operation 610 at least one corrective action may be performed. Corrective actions may include, for example, blocking the request that violated the policy, diverting the request that violated the policy to another charging system, etc. Operation 610 may be followed by a return to operation 608 to determine whether another policy violation occurred or to continue monitoring in operation 606. Instead of, or in conjunction with, continuing to monitor for policy violations in operation 608, operation 610 may also be followed by a return to operation 604 wherein policies may be updated. Returning to operation 604 forms a feedback loop that may adjust the policies to, for example, provide effective protection for the charging systems while also not implementing over-restrictive controls that may throttle message traffic to a point that could also negatively impact network performance.

While FIG. 6 illustrates operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, this disclosure is directed to system to monitor and control data flow in a network. At least one device in a core network may be responsible for charging functions related to the data requests. During certain high usage scenarios (e.g., emergencies, special events, etc.), it may be possible for the charging system to be overwhelmed. For example, a policing system may be implemented in the core network to at least manage the flow of requests to the charging system. The policing system may monitor and control request flow to the charging system based on at least one policy. When a request is determined to violate a policy, the policing system may take corrective action to prevent the charging system from being overwhelmed. For example, the policing system may block the request, divert the request to another charging system that may have available capacity, etc.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system to monitor and control data flow in a network.

According to example 1 there is provided at least one device for network traffic control. The device may comprise communication circuitry to interact with other devices in a core network and policing circuitry to analyze a request intended for a credit control system in the core network, determine whether the request violates a policy controlling data flow to the credit control system and control whether the request is allowed to proceed to the credit control system based on the policy determination.

Example 2 may include the elements of example 1, wherein the core network is a Long Term Evolution (LTE) evolved packet core (EPC) network.

Example 3 may include the elements of example 2, wherein the request is received from at least one wireless device via a base station coupled to the EPC network.

Example 4 may include the elements of any of examples 1 to 3, wherein the policing circuitry comprises at least processing circuitry to execute instructions to cause the processing circuitry to at least perform policing operations.

Example 5 may include the elements of any of examples 1 to 4, wherein the devices in the core network are linked via interfaces with which the policing circuitry is to interact to control which requests are allowed to proceed to the credit control system.

Example 6 may include the elements of example 5, wherein the interfaces are based on the Diameter protocol.

Example 7 may include the elements of example 6, wherein a Diameter protocol stack comprises a new policing agent at the application level to at least identify request traffic routed to the credit control system and identify at least one type of request making up the request traffic.

Example 8 may include the elements of any of examples 1 to 7, wherein the policing circuitry is further to take corrective action when it is determined that the request violates the policy.

Example 9 may include the elements of example 8, wherein the corrective action comprises the policing circuitry at least blocking the request from proceeding to the credit control system.

Example 10 may include the elements of any of examples 8 to 9, wherein the corrective action comprises the policing circuitry at least redirecting the request to another credit control system having available capacity.

Example 11 may include the elements of any of examples 8 to 10, wherein the corrective action comprises the policing circuitry at least one of blocking the request from proceeding to the credit control system or redirecting the request to another credit control system having available capacity.

Example 12 may include the elements of any of examples 1 to 11, wherein the policing circuitry is further to receive configuration data for configuring at least the policy.

Example 13 may include the elements of any of examples 1 to 12, wherein the core network is a Long Term Evolution (LTE) evolved packet core (EPC) network and the request is received from at least one wireless device via a base station coupled to the EPC network.

Example 14 may include the elements of any of examples 1 to 13, wherein the devices in the core network are linked via interfaces with which the policing circuitry is to interact to control which requests are allowed to proceed to the credit control system, the interfaces being based on the Diameter protocol.

Example 15 may include the elements of any of examples 1 to 14, wherein the policing circuitry is fully implemented in hardware.

Example 16 may include the elements of any of examples 1 to 15, wherein the policing circuitry is to provide feedback data to at least one entity.

Example 17 may include the elements of example 16, wherein the feedback comprises at least one of alerts or reporting.

Example 18 may include the elements of any of examples 16 to 17, wherein the feedback is related to at least one of request flow or policy violations.

Example 19 may include the elements of any of examples 16 to 18, wherein the at least one entity comprises at least one of a network owner, a governmental regulator or a consumer advocacy group.

Example 20 may include the elements of any of examples 1 to 19, wherein the policing circuitry is to update the policy using data related to policy violations.

According to example 21 there is provided a method for network traffic control. The method may comprise analyzing, using policing circuitry in a core network, a request intended for a credit control system in the core network, determining, using the policing circuitry, whether the request violates a policy controlling data flow to the credit control system and allowing, using the policing circuitry, the request to proceed to the credit control system or block the request from proceeding to the credit control system based on the policy determination.

Example 22 may include the elements of example 21, and may further comprise using the policing circuitry to interact with interfaces coupling devices in the core network to control which requests are allowed to proceed to the credit control system.

Example 23 may include the elements of example 22, wherein the interfaces are based on the Diameter protocol.

Example 24 may include the elements of example 23, wherein a Diameter protocol stack comprises a new policing agent at the application level to at least identify request traffic routed to the credit control system and identify at least one type of request making up the request traffic.

Example 25 may include the elements of any of examples 21 to 24, and may further comprise taking corrective action when it is determined that the request violates the policy.

Example 26 may include the elements of example 25, wherein the corrective action comprises at least one of blocking the request from proceeding to the credit control system or redirecting the request to another credit control system having available capacity.

Example 27 may include the elements of any of examples 21 to 26, and may further comprise receiving configuration data for configuring at least the policy.

Example 28 may include the elements of any of examples 21 to 27, and may further comprise using the policing circuitry to interact with interfaces coupling devices in the core network to control which requests are allowed to proceed to the credit control system, wherein the interfaces are based on the Diameter protocol.

Example 29 may include the elements of any of examples 21 to 28, and may further comprise taking corrective action when it is determined that the request violates the policy, wherein the corrective action comprises at least one of blocking the request from proceeding to the credit control system or redirecting the request to another credit control system having available capacity.

Example 30 may include the elements of any of examples 21 to 29, and may further comprise providing feedback to at least one entity.

Example 31 may include the elements of any of examples 21 to 30, and may further comprise updating the policy using data related to policy violations.

According to example 32 there is provided a system including at least one device, the system being arranged to perform the method of any of the above examples 21 to 31.

According to example 33 there is provided a chipset arranged to perform the method of any of the above examples 21 to 31.

According to example 34 there is provided at least one machine readable medium comprising a plurality of instructions that, in response to be being executed on a computing device, cause the computing device to carry out the method according to any of the above examples 21 to 31.

According to example 35 there is provided at least one device equipped for network traffic control, the at least one device being arranged to perform the method of any of the above examples 21 to 31.

According to example 36 there is provided a system for network traffic control. The system may comprise means for analyzing, using policing circuitry in a core network, a request intended for a credit control system in the core network, means for determining, using the policing circuitry, whether the request violates a policy controlling data flow to the credit control system and means for allowing, using the policing circuitry, the request to proceed to the credit control system or block the request from proceeding to the credit control system based on the policy determination.

Example 37 may include the elements of example 36, and may further comprise means for using the policing circuitry to interact with interfaces coupling devices in the core network to control which requests are allowed to proceed to the credit control system.

Example 38 may include the elements of example 37, wherein the interfaces are based on the Diameter protocol.

Example 39 may include the elements of example 38, wherein a Diameter protocol stack comprises a new policing agent at the application level to at least identify request traffic routed to the credit control system and identify at least one type of request making up the request traffic.

Example 40 may include the elements of any of examples 36 to 39, and may further comprise means for taking corrective action when it is determined that the request violates the policy.

Example 41 may include the elements of example 40, wherein the corrective action comprises means for at least one of blocking the request from proceeding to the credit control system or redirecting the request to another credit control system having available capacity.

Example 42 may include the elements of any of examples 36 to 41, and may further comprise means for receiving configuration data for configuring at least the policy.

Example 43 may include the elements of any of examples 36 to 42, and may further comprise means for providing feedback to at least one entity.

Example 44 may include the elements of any of examples 36 to 43 and may further comprise means for updating the policy using data related to policy violations.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device for network traffic control, comprising:
communication circuitry to interact with other devices in a core network; and
policing circuitry, the policing circuitry configured to:
analyze a request received from user equipment (UE) intended for a credit control system in the core network, wherein the credit control system manages resource usage by the UE;
determine whether the request received from the UE violates a policy controlling data flow to the credit control system;
determine whether to update the policy; and
responsive to a determination that the request received from the UE violates the policy controlling data flow to the credit control system, and a determination that the policy is not to be updated:
transfer the request received from the UE to at least one of the other devices in the core network to support the request from the UE; and
allow the request received from the UE to proceed.

2. The device of claim 1, wherein the credit control system includes:
an offline charging system to retain data representative of resource usage by the UE; and
an online charging system to perform real-time billing of resource usage by the UE;
wherein the policing circuitry is further configured to:
responsive to a determination that the request from the UE does not violate the policy controlling data flow to the credit control system, and a determination that the policy is not to be updated:
compare the request with the policy controlling data flow to the credit control system; and
control whether the request is allowed to proceed on either the offline charging system or the online charging system based on a policy controlling data flow to the credit control system.

3. The device of claim 2, wherein the offline charging system collects the data representative of resource usage by the UE concurrently with the resource usage by the UE.

4. The device of claim 3, wherein the offline charging system generates a file for billing a user for the resource usage.

5. The device of claim 1, wherein to determine whether the request from the UE violates the policy controlling data flow to the credit control system includes determining whether the request from the UE exceeds a request capacity of the credit control system.

6. The device of claim 1, wherein the core network is a Long Term Evolution (LTE) evolved packet core (EPC) network.

7. The device of claim 6, wherein the request is received from at least one wireless device via a base station coupled to the EPC network.

8. The device of claim 1, wherein the policing circuitry comprises at least processing circuitry to execute instructions to cause the processing circuitry to at least perform policing operations.

9. The device of claim 1, wherein devices in the core network are linked via interfaces with which the policing circuitry is to interact to control which requests are allowed to proceed to the credit control system.

10. The device of claim 1, wherein to determine whether to update the policy is based on one or more of: an expiration condition set in the policy or a change in a configuration of the core network.

11. The device of claim 1, wherein responsive to a determination that the request received from the UE violates the policy controlling data flow to the credit control system, and a determination that the policy is not to be updated the policing circuitry is further configured to:
transfer the request received from the UE to two or more of the other devices in the core network;
request a reconfiguration operation of at least one of the two or more other devices;
receive a confirmation of the reconfiguration operation; and
responsive to receiving the confirmation, allow the request from the UE to proceed.

12. A method for network traffic control comprising:
analyzing, using policing circuitry in a core network, a request received from user equipment (UE) intended for a credit control system in the core network, wherein the credit control system manages resource usage by the UE;
determining whether the request received from the UE violates a policy controlling data flow to the credit control system;
determine whether to update the policy; and
responsive to a determination that the request received from the UE violates the policy controlling data flow to the credit control system, and a determination that the policy is not to be updated:

transferring the request received from the UE to at least one other device in the core network to support the request from the UE; and allowing the request received from the UE to proceed.

13. The method of claim 12, wherein the credit control system includes:

an offline charging system to retain data representative of resource usage by the UE; and an online charging system to perform real-time billing of resource usage by the UE;

wherein the policing circuitry is further configured to:

responsive to a determination that the request from the UE does not violate the policy controlling data flow to the credit control system, and a determination that the policy is not to be updated:

compare the request with the policy controlling data flow to the credit control system; and control whether the request is allowed to proceed on either the offline charging system or the online charging system based on a policy controlling data flow to the credit control system.

14. The method of claim 12, wherein to determine whether the request from the UE violates the policy controlling data flow to the credit control system includes determining whether the request from the UE exceeds a request capacity of the credit control system.

15. The method of claim 12, wherein devices in the core network are linked via interfaces with which the policing circuitry is to interact to control which requests are allowed to proceed to the credit control system.

16. The method of claim 15, wherein the interfaces are based on the Diameter protocol.

17. The method of claim 16, wherein a Diameter protocol stack comprises a new policing agent at the application level to at least identify request traffic routed to the credit control system and identify at least one type of request making up the request traffic.

18. The method of claim 12, wherein responsive to a determination that the request received from the UE violates the policy controlling data flow to the credit control system, and a determination that the policy is not to be updated, the method further comprises:

redirecting the request to another credit control system having available capacity.

19. The method of claim 12, wherein the policing circuitry is further to receive configuration data for configuring at least the policy.

20. At least one non-transitory machine-readable storage medium having stored thereon, individually or in combination, instructions for network traffic control that, when executed by one or more processors, cause the one or more processors to:

analyze, using policing circuitry in a core network, a request received from user equipment (UE) intended for a credit control system in the core network, wherein the credit control system manages resource usage by the UE;

determine whether the request received from the UE violates a policy controlling data flow to the credit control system;

determine whether to update the policy; and responsive to a determination that the request received from the UE violates the policy controlling data flow to the credit control system, and a determination that the policy is not to be updated:

transfer the request received from the UE to at least one other device in the core network to support the request from the UE; and allow the request received from the UE to proceed.

21. The at least one non-transitory machine-readable storage medium of claim 20, wherein the credit control system includes:

an offline charging system to retain data representative of resource usage by the UE; and an online charging system to perform real-time billing of resource usage by the UE;

wherein the policing circuitry is further configured to:

responsive to a determination that the request from the UE does not violate the policy controlling data flow to the credit control system, and a determination that the policy is not to be updated:

compare the request with the policy controlling data flow to the credit control system; and control whether the request is allowed to proceed on either the offline charging system or the online charging system based on a policy controlling data flow to the credit control system.

22. The at least one non-transitory machine-readable storage medium of claim 21, wherein the offline charging system collects the data representative of resource usage by the UE concurrently with the resource usage by the UE.

23. The at least one non-transitory machine-readable storage medium of claim 22, wherein the offline charging system generates a file for billing a user for the resource usage.

24. The at least one non-transitory machine-readable storage medium of claim 20, wherein to determine whether the request from the UE violates the policy controlling data flow to the credit control system includes determining whether the request from the UE exceeds a request capacity of the credit control system.

25. The at least one non-transitory machine-readable storage medium of claim 20, wherein the core network is a Long Term Evolution (LTE) evolved packet core (EPC) network.

26. The at least one non-transitory machine-readable storage medium of claim 25, wherein the request is received from at least one wireless device via a base station coupled to the EPC network.

27. The at least one non-transitory machine-readable storage medium of claim 20, wherein the policing circuitry comprises at least processing circuitry to execute instructions to cause the processing circuitry to at least perform policing operations.

* * * * *